(No Model.)
J. W. CASSIDY.
Process for Drying Fruit.
No. 233,473.          Patented Oct. 19, 1880.
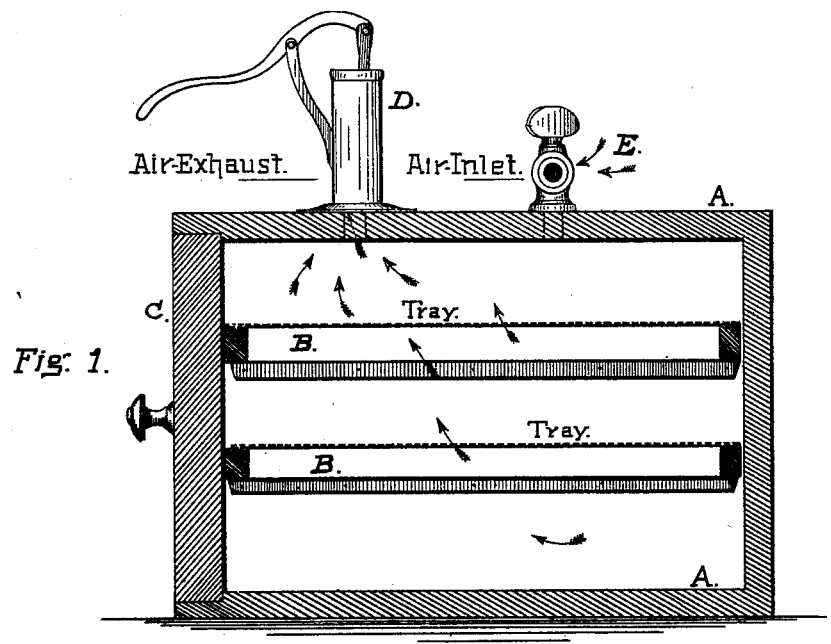
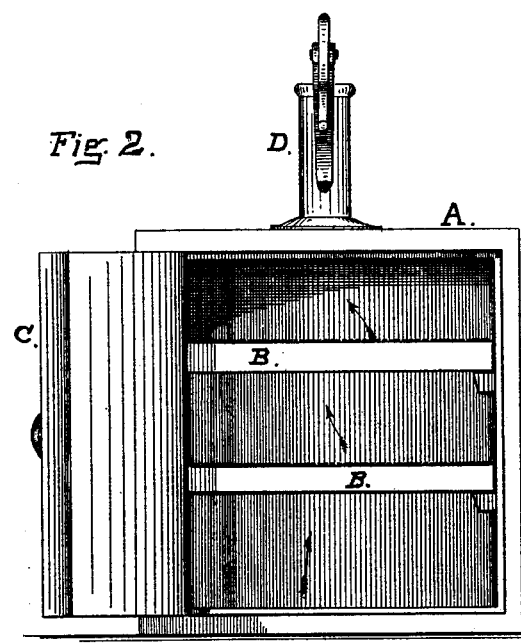
Witnesses
J. L. Boone
Wm. F. Clark
Inventor:
John W. Cassidy
by his Attys.,
Boone & Osborn.

UNITED STATES PATENT OFFICE.

JOHN W. CASSIDY, OF PETALUMA, CALIFORNIA.

PROCESS FOR DRYING FRUIT.

SPECIFICATION forming part of Letters Patent No. 233,473, dated October 19, 1880.

Application filed April 26, 1880. (No model.)

*To all whom it may concern:*

Be it known that I, JOHN W. CASSIDY, of Petaluma, county of Sonoma and State of California, have invented an Improved Process for Drying Fruit; and I do hereby declare that the following is a full, clear, and exact description thereof, reference being had to the accompanying drawings.

This invention has reference to a process for extracting the surplus moisture from fruit and other substances, and belongs to that class of driers in which the substance is first treated to a current of dry warm air, and then, secondly, introduced into a vacuum-chamber, these steps being observed alternately in the further treatment of the substance.

My process is accomplished by placing the fruit or other substance in an air-tight box or case, and then alternately exhausting the air from inside of the box or case, so as to open the pores of the fruit, and admitting a sudden inrush of air, either hot or cold, into the box, which is again exhausted. I proceed thus, alternately exhausting the air from in and around the fruit or substance, and then suddenly admitting air into and around it, until its surplus moisture is taken up and carried away and the fruit or other substance is left in the condition called "dried."

Referring to the drawings, Figure 1 is a vertical section taken longitudinally through my fruit-drier. Fig. 2 is a front view with the door open.

The box or case A, in which the fruit or other substance is placed, as above stated, must be air-tight. Inside of this box or case I arrange trays, shelves, or raddles B B, in any convenient manner, upon which the fruit is placed. A door, C, is provided at one side of the box, through which the fruit is introduced and properly arranged, and this door is made to close perfectly air-tight. Upon the box or case A is an air-pump, D, by means of which the air can be exhausted from inside of the box, and E is an air-cock through which air can be admitted into it.

When the fruit or other substance has been placed in the box I close the door and by means of the pump exhaust the air from the box, so as to produce a vacuum or partial vacuum. This opens the pores of the fruit or other substance, so that when air is admitted into the box again it will penetrate the fruit or substance, and if the air admitted be dry it will absorb the moisture from the fruit, so that when it is again withdrawn it will carry the moisture with it. I prefer to use air of the ordinary temperature which has been deprived of its moisture by passing it over some hygroscopic substance before admitting it into the box. This process extracts the moisture from the air, so that it is ready to take up the moisture in the fruit when it is admitted into the box. Air which has been reduced in temperature is also a splendid vehicle for removing the moisture, and, if desired, heated air could be used; but I prefer not to use heated air, as the heat has a tendency to seal the surface of the fruit or substance, and thus prevent the escape of the moisture, whereas by using air of the ordinary temperature, or even cold air, the moisture is extracted uniformly from the interior of the fruit or substance, from the center outward. I thus alternately exhaust the air from the box and admit fresh air into it until the surplus moisture in the fruit has been extracted, leaving it in a dehydrated or desiccated condition.

By this means I produce a superior article of dried fruit, I avoid liability of burning or scorching, and the fruit will not be so liable to deteriorate or become wormy, because the moisture is evenly and uniformly extracted.

Having described my invention, what I claim, and desire to secure by Letters Patent, is—

The process of extracting moisture from fruit and other substances consisting in subjecting it, while inclosed in a tight chamber, alternately to the action of a vacuum or partial vacuum and an inrush of dehydrated air, the fruit remaining within the chamber throughout the process, substantially as specified.

In witness whereof I have hereunto set my hand and seal.

JOHN W. CASSIDY. [L. S.]

Witnesses:
WM. F. CLARK,
EDWARD E. OSBORN.